United States Patent
Legrand et al.

(10) Patent No.: US 7,410,129 B2
(45) Date of Patent: Aug. 12, 2008

(54) STACKING TIE-ROD RELEASE DEVICE FOR A DEPLOYABLE STRUCTURE

(75) Inventors: Silvain Legrand, Nice (FR); Rodolphe Chaix, Carnoules (FR)

(73) Assignee: Thales, Neuilly sur Seine (FR)

( * ) Notice: Subject to any disclaimer, the term of this patent is extended or adjusted under 35 U.S.C. 154(b) by 785 days.

(21) Appl. No.: 10/895,337

(22) Filed: Jul. 21, 2004

(65) Prior Publication Data
US 2005/0050841 A1    Mar. 10, 2005

(30) Foreign Application Priority Data
Jul. 22, 2003    (FR) .................................. 03 08903

(51) Int. Cl.
*B64G 1/42*    (2006.01)
(52) U.S. Cl. ................. 244/159.5; 244/172.9
(58) Field of Classification Search ............. 244/172.7, 244/172.9, 172.8, 159.5, 172.6
See application file for complete search history.

(56) References Cited

U.S. PATENT DOCUMENTS

| | | | |
|---|---|---|---|
| 4,347,023 A | * | 8/1982 | Rizos .......................... 248/507 |
| 4,419,033 A | | 12/1983 | Roth et al. |
| 4,641,798 A | | 2/1987 | De Haan et al. |
| 6,073,914 A | * | 6/2000 | Roth et al. ................. 254/29 A |
| 7,222,822 B2 | * | 5/2007 | Roth et al. ............... 244/172.7 |

* cited by examiner

*Primary Examiner*—Timothy D Collins
(74) *Attorney, Agent, or Firm*—Sughrue Mion, PLLC

(57) ABSTRACT

The invention relates to devices for releasing the stacking tie-rods that are used for holding deployable structures, in particular solar panels of artificial satellites. The device of the invention is self-releasing in order to enable such deployable structures to be released via the top portion of the stacking column. The invention consists in holding together the members (101) that are to be deployed by means of a tie-rod (102) having a nut (111) screwed onto its free end. The force for holding the stack together is transmitted by modules (106, 107) which are themselves held together by said force. When the stacking tension is reduced, resilient means, such as two flat spring blades (112, 113), cause the modules to move away from the tie-rod, thus enabling the members of the deployable structure to be released.

10 Claims, 3 Drawing Sheets

STACKING TIE-ROD RELEASE DEVICE FOR A DEPLOYABLE STRUCTURE

BACKGROUND OF THE INVENTION

The present invention relates to devices that release the stacking tie-rods that hold a deployable structure in the closed position. It applies in particular to artificial satellites which often include structures such as solar panels that are folded against the body on the satellite during launch and that are subsequently deployed while the satellite is being put on station.

In order to be able to deploy the structure that is held by the tie-rods, it is known to cut the rods by means of pyrotechnic devices. The structure is subsequently deployed by means that are themselves known, such as springs, for example.

Cutting is performed either at the head of the tie-rod, or else at its foot. In the first case, the tie-rod remains attached to the body of the satellite. In the second case, it remains attached to the outermost portion of the deployable structure.

The technique in which the tie-rod remains attached to the body of the satellite is the more favorable technique for maintaining the best performance of the deployable structure. It is safer during deployment movements, in particular with solar panels. Nevertheless it presents constraints since it requires the stacking tie-rod release device (and its control cabling) to be placed on the last elements of the structure that is to be deployed, thereby constituting a source of mechanical complication.

SUMMARY OF THE INVENTION

To mitigate those drawbacks, the invention proposes a stacking tie-rod release device for a deployable structure in which members that are to be deployed are fixed on bushings threaded in superposition on a tie-rod secured to the body of the satellite against which they are held by a nut screwed onto the free end of the tie-rod, the device being characterized in that it includes at least two modules placed between the nut and the first of the bushings and exerting a strong force on the set of bushings for holding the assembly together, and in that the modules include resilient means tending to space them away from the tie-rod by exerting lateral forces in order to release the set of bushings from the action of the tie-rod; the force exerted by the nut on the modules enabling them to be held together by friction opposing said lateral forces, the assembly being stable under stacking tension and enabling the top end of the stacking column to be released beside the structure to be deployed merely by reducing the stacking tension, thereby leading to a self-releasing effect.

The two modules may, in particular, be in the form of two half-shells.

According to another characteristic, the resilient means tend to move the modules away from the stacking tie-rod, thus making the device unstable in its closed position under the stacking tension, thereby enabling the deployable structure to be released.

According to another characteristic, the resilient means are formed by two flat spring blades placed in the respective top ends of the modules so as to be horizontal in their length direction and vertical in their width direction, being substantially parallel to each other.

According to another characteristic, the resilient means are formed by a bunch of resilient arms each fixed to the tie-rod and tending to move the modules apart.

According to another characteristic, the resilient means are formed by axially-directed springs placed between the modules and the tie-rod.

According to another characteristic, the resilient means are formed by tangentially-directed springs placed between the modules themselves.

According to another characteristic, the modules include at their bottom ends two flat outwardly-directed rim portions, and the first bushing presents an inside shape into which the rim portions become engaged when in the deployed position.

The first bushing presents an inside shape in the form of a hollow circular groove.

According to another characteristic, the device includes a spacer inserted between the nut and the modules, with the resilient means coming to bear against the sides thereof, as do the two spring blades.

BRIEF DESCRIPTION OF THE DRAWING

Other features and advantages of the invention will appear clearly in the following description given by way of non-limiting example and with reference to the accompanying figures, in which.

DETAILED DESCRIPTION OF THE INVENTION

Figure 1:
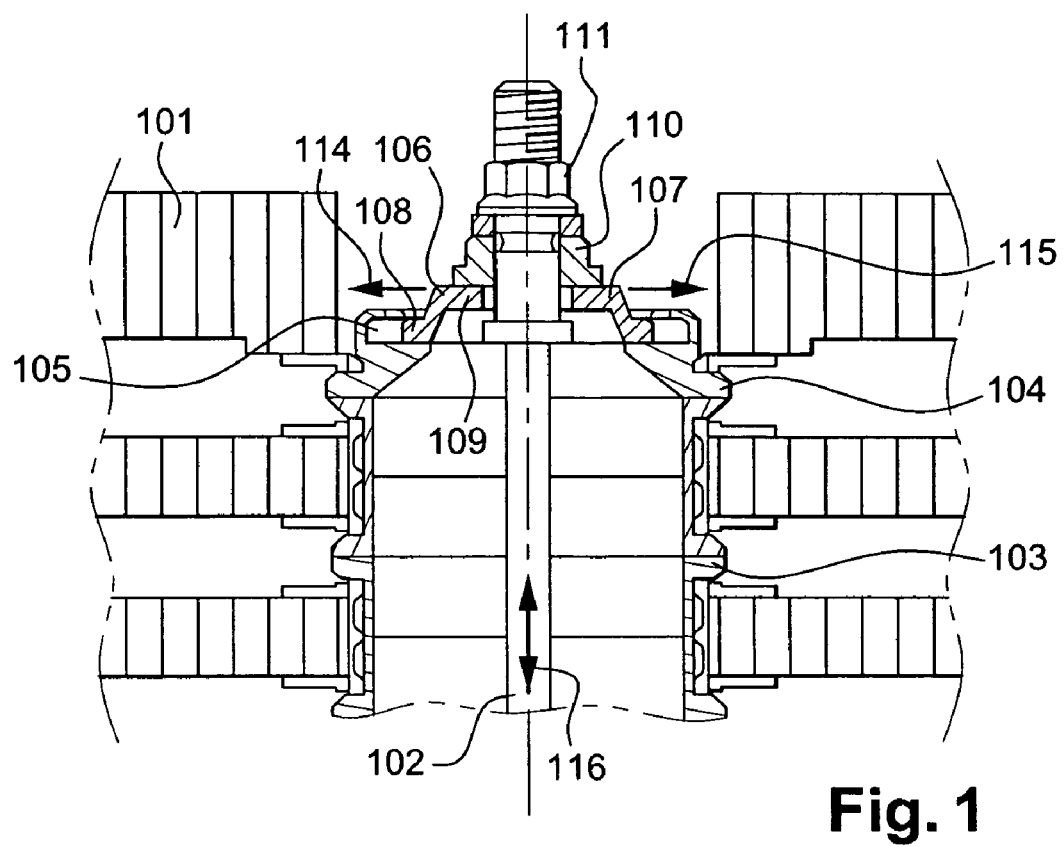
FIG. 1 is a section view through a device of the invention with a portion of the solar panels in a stowed configuration in which they are held by the tie-rod.
Figure 2:
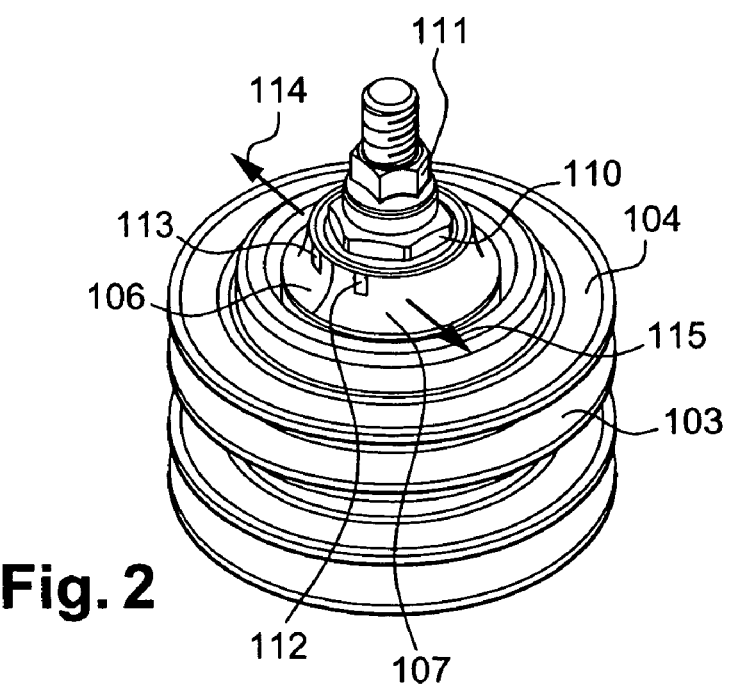
FIG. 2 is a perspective view of the FIG. 1 device in the same configuration, but without the solar panels.

In FIGS. 1 and 2, a set of solar panels 101 is held in the stowed position by a tie-rod 102 assisted by a set of circular bushings 103.

The first bushing 104 is modified in accordance with the invention so as to form part of the release device of the invention. For this purpose, its top portion presents a hollow inside shape 105 (in this example in the form of a circular groove) whose purpose is to hold modules (in this example in the form of shell portions) on the bushing 104 when the modules are no longer held by the tie-rod.

These modules 106 and 107 are semicircular and are clamped against the top end of the tie-rod 102 so that when they are united they form a complete circular shell.

This shell is in the form of an upside-down cup which is extended at its bottom end by a flat outwardly-directed circular rim 108 subdivided into n pieces at the junctions between the modules to form n rim portions.

The circular rim is engaged in the shape 105 so as to be secured to the first bushing 104, while still being capable of sliding sideways inside said shape when the modules move apart from each other.

The flat top end of the shell presents the form of a flat inwardly-directed circular rim 109 that is relatively thick, itself being subdivided into n pieces at the junctions between the shell portions. It is this rim 109 that has its inside edges clamped against the top end 102a of the tie-rod 102 when the shell is closed.

A standard spacer 110 is engaged on the top end of the tie-rod 102 and bears against the inwardly-directed rim 109.

A lock nut 111 is screwed onto the threaded top end 102a of the tie-rod 102.

While the assembly is being assembled in the stowage position, the modules 106 and 107 are held in their assembled-together position by appropriate tooling, such as a special clamp, for example, in order to form a complete shell.

Tightening the nut 111 causes the spacer 110 to press against the top face of the shell 106, 107. This causes it to press the first bushing 104 against the following bushing, and the following bushing on the next, etc.

When the nut 111 is tightened with sufficient torque, the assembly is held together firmly so as to remain assembled until the deployment command is issued.

In accordance with the invention, springs 112 and 113 may be inserted in slots formed in the top ends of the modules 106 and 107.

These slots are placed in positions such that when the half-shells 106 and 107 are moved towards each other, the springs 112 and 113 press against the sides of the spacer 110 and deform in such a manner as to exert lateral forces represented by arrows 114 and 115. These forces tend to move the modules 106 and 107 apart, urging the circular rim 108 into the groove 105 until they reach the bottom thereof.

The slots are also placed so that in the spaced-apart position, the spring is further inside the modules than the edges of the modules themselves.

In accordance with the invention, the clamping coming from the nut 111 is sufficient to exert tension in the tie-rod 102 as represented by arrow 116, thus making it possible, by means of the friction force of the spacer 110 acting on the top ends of the modules, to prevent the modules from moving apart under all the circumstances that might occur prior to the deployment command, and in particular when the modules are subjected to vibration.

Once the satellite is on station and the solar panels 101 are to be deployed, a deployment command is issued by means of a stacking device that is known in the art (e.g. a shape memory alloy (SMA) actuator or a nut of the type that splays open like a flower with little shock), and it leads to vertical displacement of the tie-rod, and as a result reduces tension in the stack.

Once the tension has dropped sufficiently, the pressure exerted on the spacer 110, and thus the pressure it exerts on the modules 106 and 107, drops below the value which holds them together.

The force of the springs 112 and 113 on the sides of the spacer 110 then allows the modules 106 and 107 to move apart, causing the rim portions 108 to enter into the groove 105, as explained above.

Figure 3:
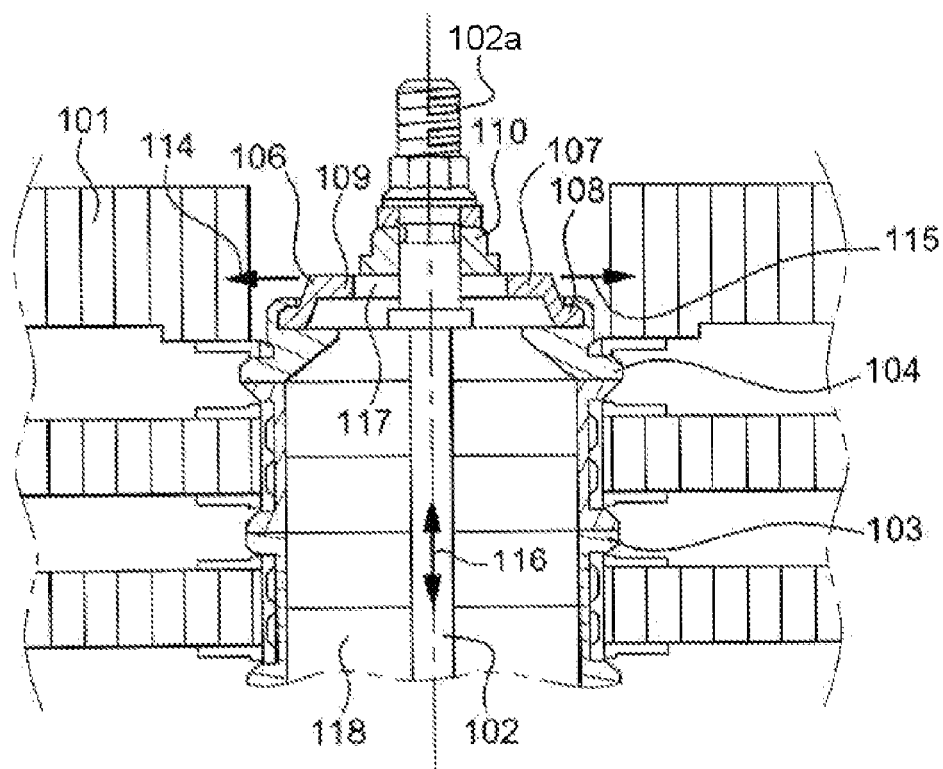
FIG. 3 is a section view through the same members as FIG. 1, but in a configuration in which the tie-rod is released.
Figure 4:
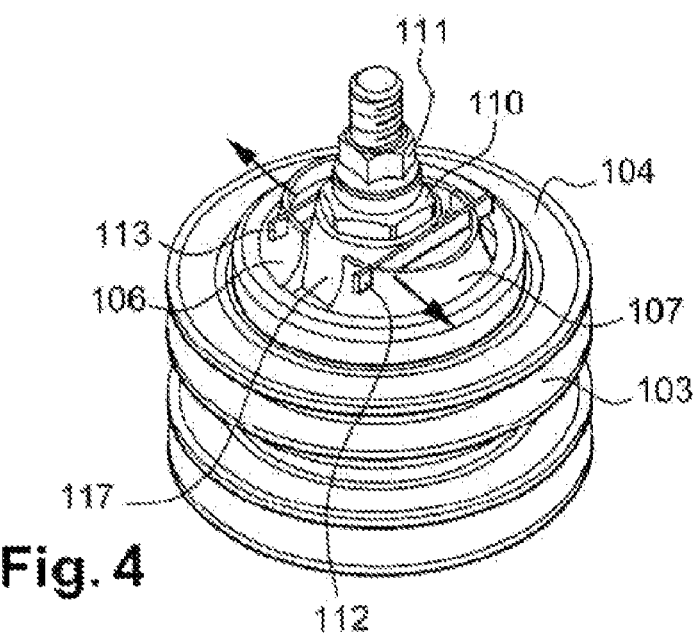
FIG. 4 is a perspective view of the FIG. 3 device but without the solar panels.

Under such conditions, the space 117 which is released between these modules becomes wider than the spacer 110, as can be seen in FIGS. 3 and 4.

The solar panel deployment members can then enter into operation, initially disengaging the top panel, with the first bushing 104 provided with its half-shells retracted into the bottom of the groove 105 moving freely past the spacer 110 and then the nut 111.

The following solar panels then deploy one after another, each of the bushings 103 then passing even more freely past the spacer and the nut since the inside space 118 of these bushings is greater than the space that was released inside the first bushing 104 by spacing the modules apart.

Figure 5:
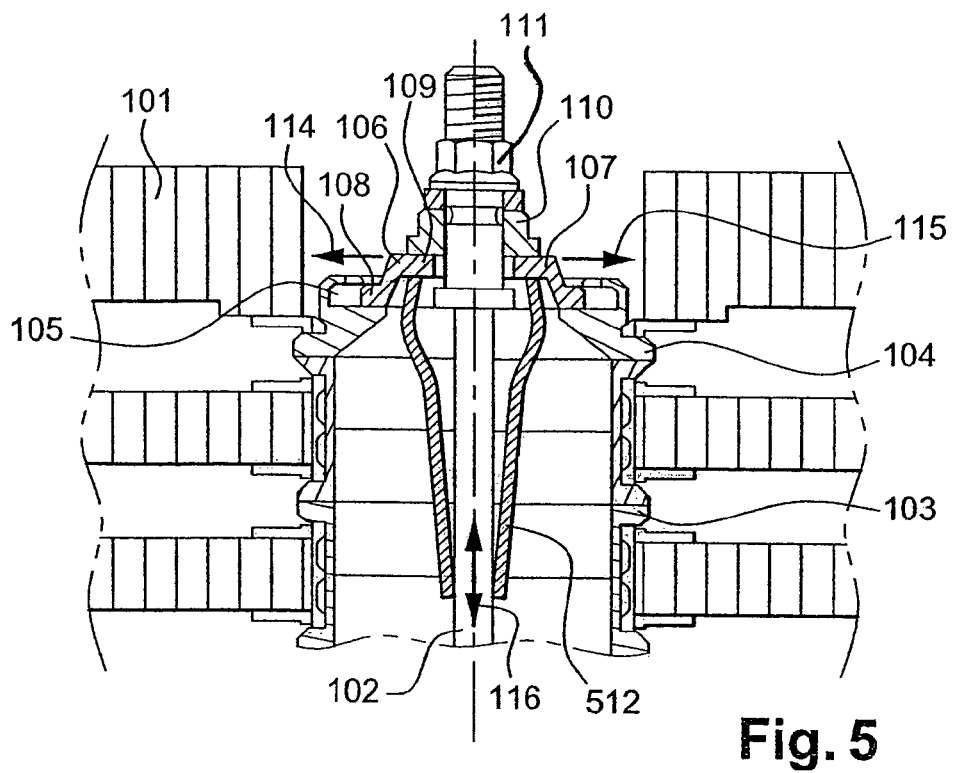
FIGS. 5 to 7 show other particular embodiments of the resilient means for disengaging the tie-rod.

In another embodiment, shown in FIG. 5, the resilient means are formed by a bunch 512 of resilient arms each fixed at its bottom end to the tie-rod and each having its top end tending to urge the modules apart.

Figure 6:
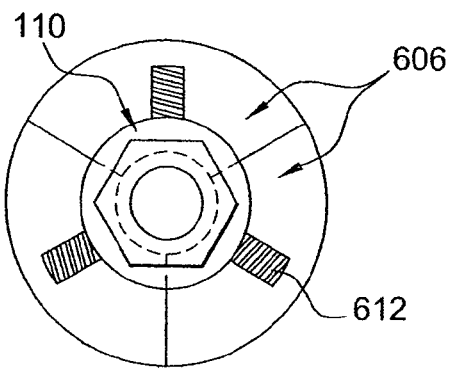

In another embodiment, shown in FIG. 6, there are more than two modules 606, in this case there are three modules, and the resilient means are formed by axial coil springs 612 placed between the modules 606 and the tie-rod against which they bear.

Figure 7:
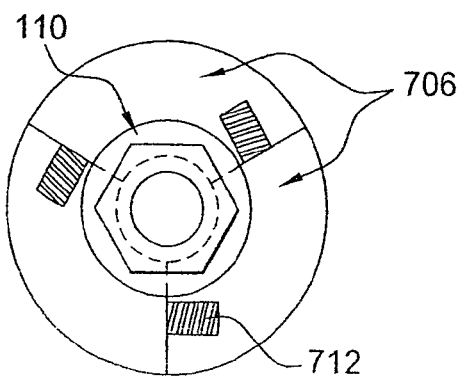

In another embodiment, shown in FIG. 7, there are more than two modules 706, in this case there are three modules, and the resilient means are formed by coil springs 712 placed tangentially between the modules themselves so that the force urging them apart acts directly between one module and a module placed immediately beside it.

The invention claimed is:

1. A stacking tie-rod release device for a deployable structure in which members (101) that are to be deployed are fixed on bushings (103) threaded in superposition on a tie-rod (102) secured to the body of a satellite against which they are held by a nut (111) screwed onto the free end of the tie-rod (102), the device being characterized in that it includes at least two modules (106, 107) placed between the nut (111) and the first of the bushings (104) and exerting a strong force (116) on the set of bushings for holding the assembly together, and in that the modules (106, 107) include resilient means (112, 113) tending to space them away from the tie-rod by exerting lateral forces (114, 115) in order to release the set of bushings (104, 103) from the action of the tie-rod (102); the force exerted by the nut (111) on the modules (106, 107) enabling them to be held together by friction opposing said lateral forces (114, 115), the assembly being stable under stacking tension and enabling the top end of the stacking column to be released beside the structure to be deployed merely by reducing the stacking tension, thereby leading to a self-releasing effect.

2. A device according to claim 1, in which the resilient means tend to move said modules away from said stacking tie-rod, thus making the device unstable in its closed position under the stacking tension, thereby enabling the deployable structure to be released.

3. A device according to claim 2, in which said resilient means are formed by two flat spring blades (112, 113) placed in the respective top ends of said modules so as to be horizontal in their length direction and vertical in their width direction, being substantially parallel to each other.

4. A device according to claim 2, in which said resilient means are formed by a bunch (512) of resilient arms each fixed to said tie-rod and tending to move said modules apart.

5. A device according to claim 2, in which said resilient means are formed by axially-directed springs (612) placed between said modules (606) and said tie-rod.

6. A device according to claim 2, in which said resilient means are formed by tangentially-directed springs (712) placed between said modules (706) themselves.

7. A device according to claim 1, in which said modules include at their bottom ends two flat outwardly-directed rim portions (108), and in which said first bushing (104) presents an inside shape (105) into which the rim portions (108) become engaged when in the deployed position.

8. A device according to claim 7, in which said first bushing presents an inside shape in the form of a hollow circular groove.

9. A device according to claim 1, including a spacer (110) inserted between said nut and said modules, with said resilient means (112, 113) coming to bear against the sides thereof.

10. A device according to claim 1, in which said modules are in the form of two half-shells.

* * * * *